United States Patent [19]

Fernie et al.

[11] Patent Number: 5,445,233
[45] Date of Patent: Aug. 29, 1995

[54] MULTI-DIRECTIONAL MOTORIZED WHEELCHAIR

[76] Inventors: Geoffrey R. Fernie, 29 Blaketon Road, Islington, Ontario, Canada, M9B 4W4; Gerald T. Griggs, 77 Shrewsbury Square, Scarborough, Ontario, Canada, M1T 1L4

[21] Appl. No.: 285,743

[22] Filed: Aug. 4, 1994

[51] Int. Cl.⁶ .................................................. B62D 11/04
[52] U.S. Cl. ..................................... 180/6.5; 180/65.1; 180/907
[58] Field of Search ................ 180/6.2, 6.44, 6.48, 180/6.5, 6.58, 6.64, 11, 12, 13, 15, 22, 24.03, 907, 65.1

[56] References Cited

U.S. PATENT DOCUMENTS

| | | | |
|---|---|---|---|
| 1,619,616 | 3/1927 | Ionides | 180/264 |
| 2,224,411 | 10/1940 | Smith | 180/218 |
| 4,128,137 | 12/1978 | Booth | 180/6.5 |
| 4,221,273 | 9/1980 | Finden | 180/6.48 |
| 4,403,673 | 9/1983 | Ball | 180/214 |
| 4,513,832 | 4/1985 | Engman | 180/6.5 |
| 5,090,513 | 2/1992 | Bussinger | 180/907 X |
| 5,121,806 | 6/1992 | Johnson | 180/65.5 |
| 5,183,133 | 2/1993 | Roy | 180/252 |
| 5,236,055 | 8/1983 | Legal | 180/65.5 |
| 5,244,051 | 9/1993 | Wu | 180/13 |
| 5,249,636 | 10/1993 | Kruse | 180/21 |

FOREIGN PATENT DOCUMENTS

| | | | |
|---|---|---|---|
| 2708727 | 8/1978 | Germany | 180/907 |
| 2810420 | 9/1978 | Germany | 180/6.5 |
| 58-161986 | 4/1983 | Japan | 180/907 |

*Primary Examiner*—Kevin T. Hurley

[57] ABSTRACT

A multi-directional motorized wheelchair having a seat portion and, a back portion, and having two drive wheels, each having a separate motor for driving one drive wheel forwardly or backwardly, independently of the other wheel, a drive wheel mounting beneath the seat, and controls for operating the wheels either simultaneously in the same direction, or one of them in one direction, or simultaneously in opposite directions, and, stabilizer wheels mounted beneath the seat, and extending outwardly from and around the drive wheels, to stabilize the chair.

5 Claims, 4 Drawing Sheets

MULTI-DIRECTIONAL MOTORIZED WHEELCHAIR

FIELD OF THE INVENTION

The invention relates to wheelchairs for disabled persons, and in particular to motorized multidirectional chairs capable of movement, from a standing start, in any desired direction, thus avoiding the need for complex turning manoeuvres, and "three-point turns" required for the use of most motorized wheelchairs.

BACKGROUND OF THE INVENTION

Motorized wheelchairs presently on the market are generally speaking adapted for movement either along a straight line or around a steered curved arc, somewhat in the same manner as an automobile. If it is desired to realign the wheelchair, for movement from a standing start or fixed position in an entirely new direction, it is generally necessary to go through complex turning manoeuvres, somewhat similar to the "three-point turn" as used in automobiles. These complex manoeuvres are sometimes difficult for disabled persons to carry out. In addition, since such wheelchairs are used indoors (as well as outdoors), the amount of space available for back and forward movement, for making a three-point turn, is often severely restricted.

In addition, existing motorized wheelchairs frequently have difficulty in traversing uneven flooring or terrain and may lose traction, or be somewhat unstable. Another desirable factor in such wheelchairs is the ability of the handicapped person to reach down and pick up something on the floor, or from a low table or shelf. With many designs of wheelchairs this is simply not possible, and the handicapped person is simply obliged to seek assistance from someone else.

Clearly it is desirable to provide such a motorized wheelchair, which can operate from a standing start, and can be directed in any desired direction, without the necessity for a series of forward and reverse movement. It is also desirable to provide such a wheelchair which can adapt itself to changes in the floor height, or terrain. It is also desirable to provide such a wheelchair which can be raised and lowered so as to permit the occupant to pick up objects from the floor, for example, or for any other reason, such as fitting under desks and tables of various heights, and reaching things off shelves and counter tops.

In addition to all of these factors, it is desirable that the chair itself may be capable of swivelling around to face any desired direction.

In addition, since the chair must be operated by a handicapped or disabled person, the controls should be of the utmost simplicity, and be capable of being operated by a single hand, or by some other means without any dexterity being required. It should be possible to interconnect with various different controls used by disabled people such as head rests fitted with switches and voice controls. It should be possible to program different performance features such as maximum speed and acceleration to match the capabilities of users with various physical and cognitive abilities.

BRIEF SUMMARY OF THE INVENTION

With a view to satisfying the foregoing desirable features the invention comprises, a multi-directional motorized wheelchair having a seat portion and a back portion, and comprising, two drive wheels, each said drive wheel having a separate motor means for driving the same forwardly or backwardly independently of the other of said wheels, mounting means mounting said drive wheels beneath said seat, and means for operating said motor means to drive said wheels either simultaneously in the same direction, or one of them in one direction, or simultaneously in opposite directions, and, stabilizer wheels mounted beneath said seat, and extending outwardly from around said drive wheels, whereby to stabilize said chair.

A further feature of the invention provides column means extending downwardly beneath said seat of said chair, and mounting means mounting said drive wheels at a lower end of said column means, whereby to engage a surface beneath said chair.

A further feature of the invention provides column means having first and second column portions, and clutch means selectively engageable and disengagable, connecting said first and second column portions, whereby said drive wheels and said mounting means may be rotated relative to said seat, when said clutch means is disengaged, and whereby when said clutch means is engaged, rotation of said drive wheels about a vertical axis will cause rotation of said chair.

A further feature of the invention provides slidable mounting means on said column means, said stabilizer wheel means attached to said slidable mounting means, and being slidable relative to said column means, and spring means urging said stabilizer wheels downwardly against a surface beneath said chair.

A further feature of the invention provides swingable coupling means connecting said drive wheel mounting means to said column means, whereby said drive wheel mounting means may tilt relative to the axis of said column means, whereby to keep said two drive wheels in contact with a surface beneath said chair.

A further feature of the invention provides telescoping means in said column means, whereby said seat may be raised and lowered relative to a surface beneath said chair, and including motor means operable to raise and lower said chair relative to said surface.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

DESCRIPTION OF A SPECIFIC EMBODIMENT

Figure 1:
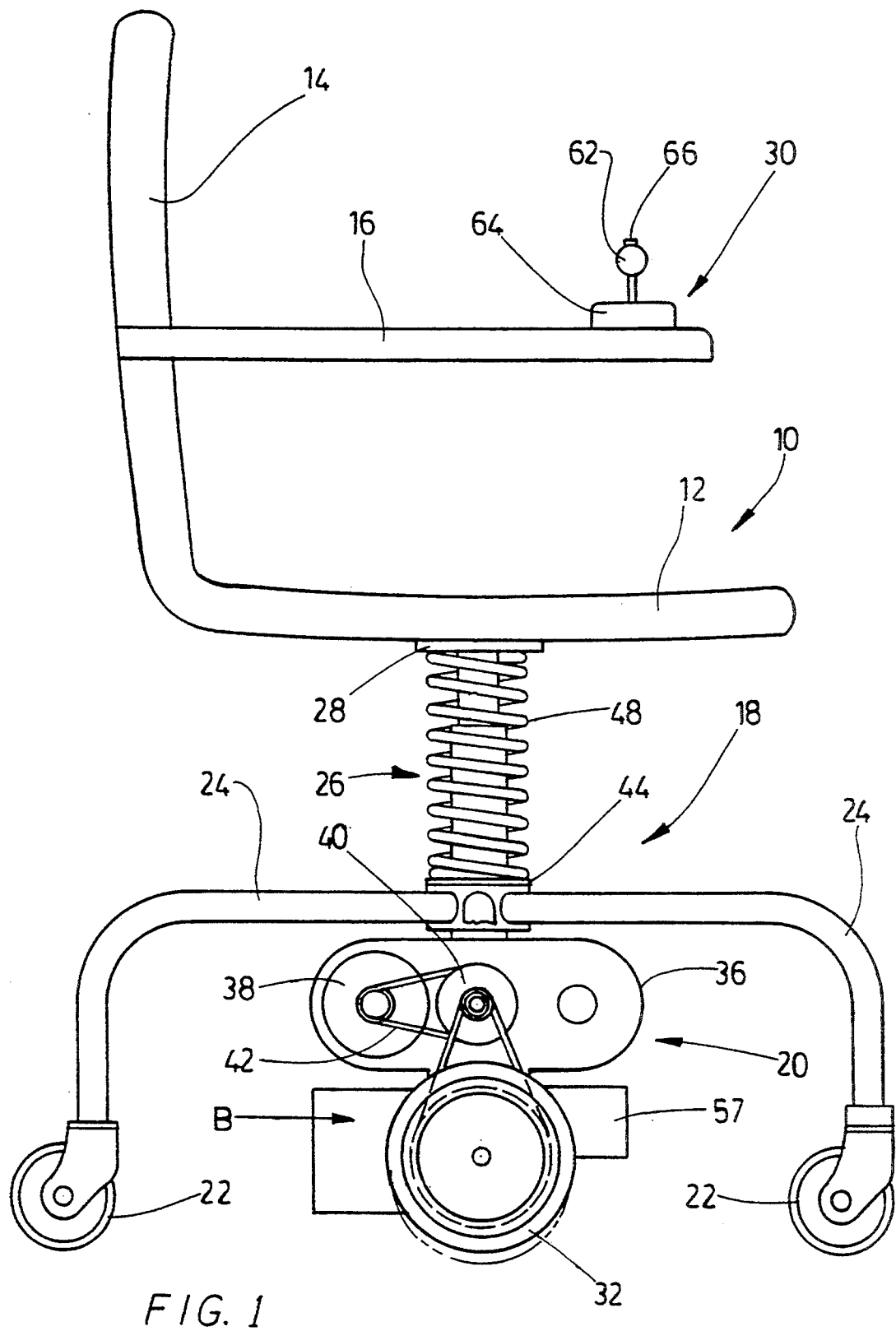
FIG. 1 is a schematic side illustration showing a chair illustrating one embodiment of the invention.

Referring first of all to FIG. 1, it will be seen that the invention here is illustrated in the form of a motorized wheelchair indicated generally as 10.

The chair 10 in this embodiment comprises a seat 12, a back 14, and may typically have two side arms 16.

A base 18 comprises a central motorized drive unit 20, and a plurality of free running outrigger wheels 22 on legs 24. Legs 24, and drive unit 20 are mounted on a central column 26, the upper end 28 of which is secured to the underside of the seat 12 of the chair 10.

A control panel indicated generally as 30 is shown, in this instance, on the right hand arm 16. It could be interchangeable for the left hand if the disabled person preferred it or was left handed, or was right hand disabled, for example. Control panel 30 in this illustration is indicated for being designed for manual use. It will of course be appreciated that some disabled persons may not have the use of their hands. Other forms of control systems are available in such cases. They may be operated by one of the limbs, or the feet, or even in some cases by the head or neck, or by voice responsive controls.

The indication therefore of the control panel 30 as being mounted on an arm of the chair is merely by way of example and for the purposes of illustration, and without in any way limiting the mode of operation of the controls or the location of them, relative to the handicapped person.

The wheels 22 have a caster action, on the legs 24, so that they will align themselves automatically with movement in any direction. They are free running, and merely provide stability for the chair.

Figure 2:
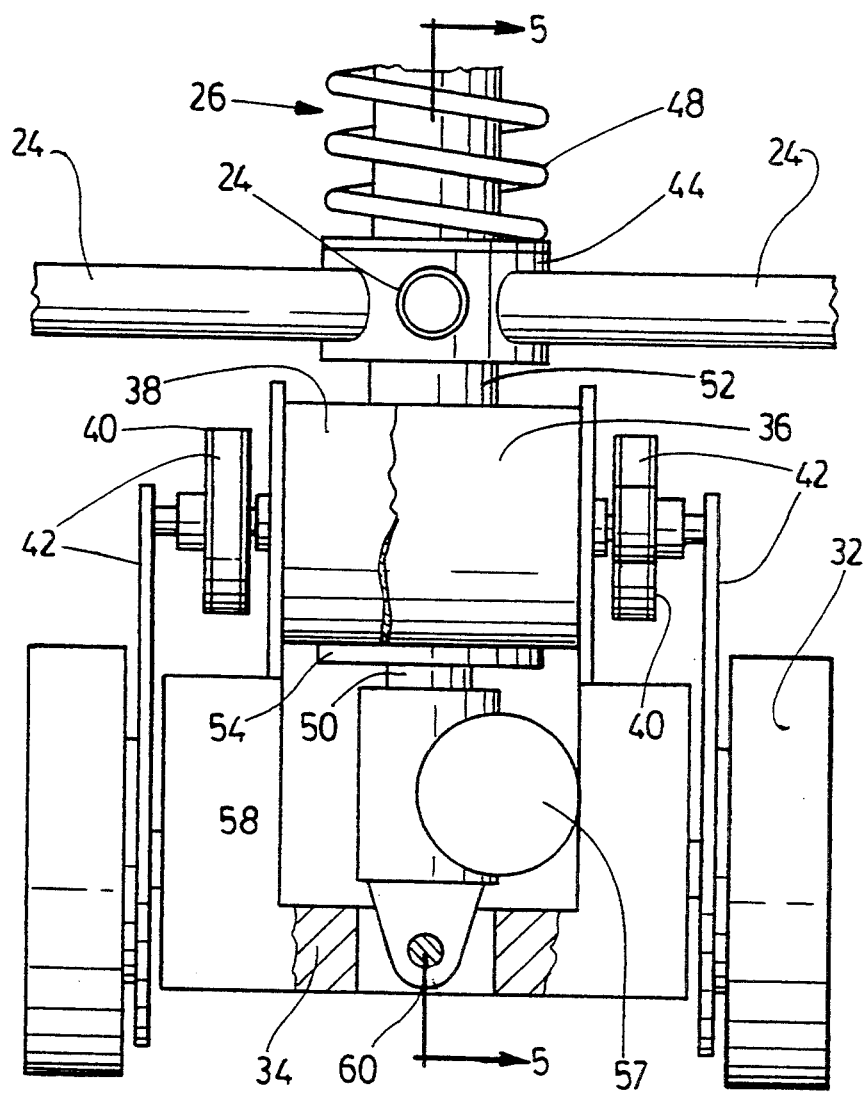
FIG. 2 is a schematic front elevation of the motorized drive unit, shown in isolation from the chair, and partly cut away.
Figure 3:
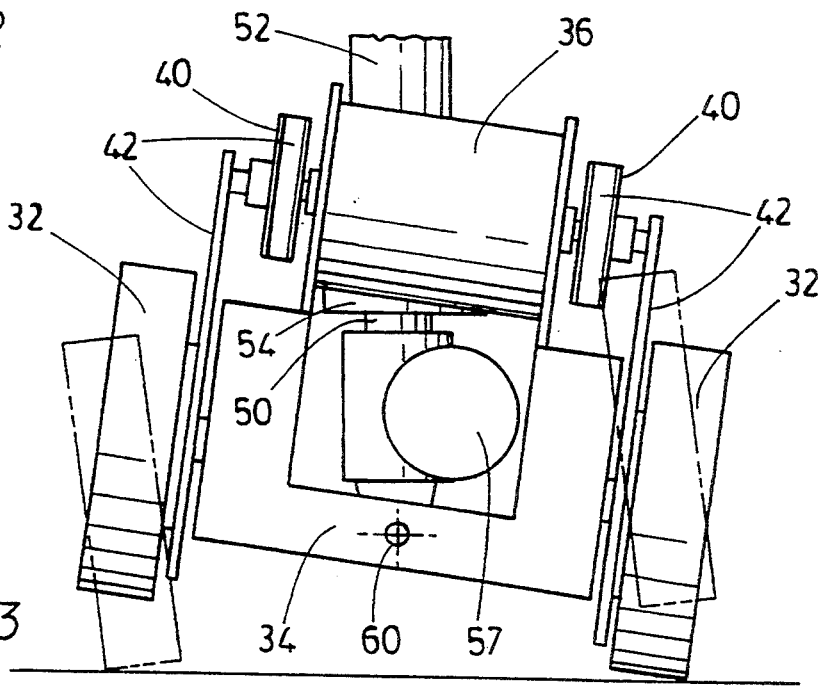
FIG. 3 is a front elevation of FIG. 2, showing movement in phantom.
Figure 4:
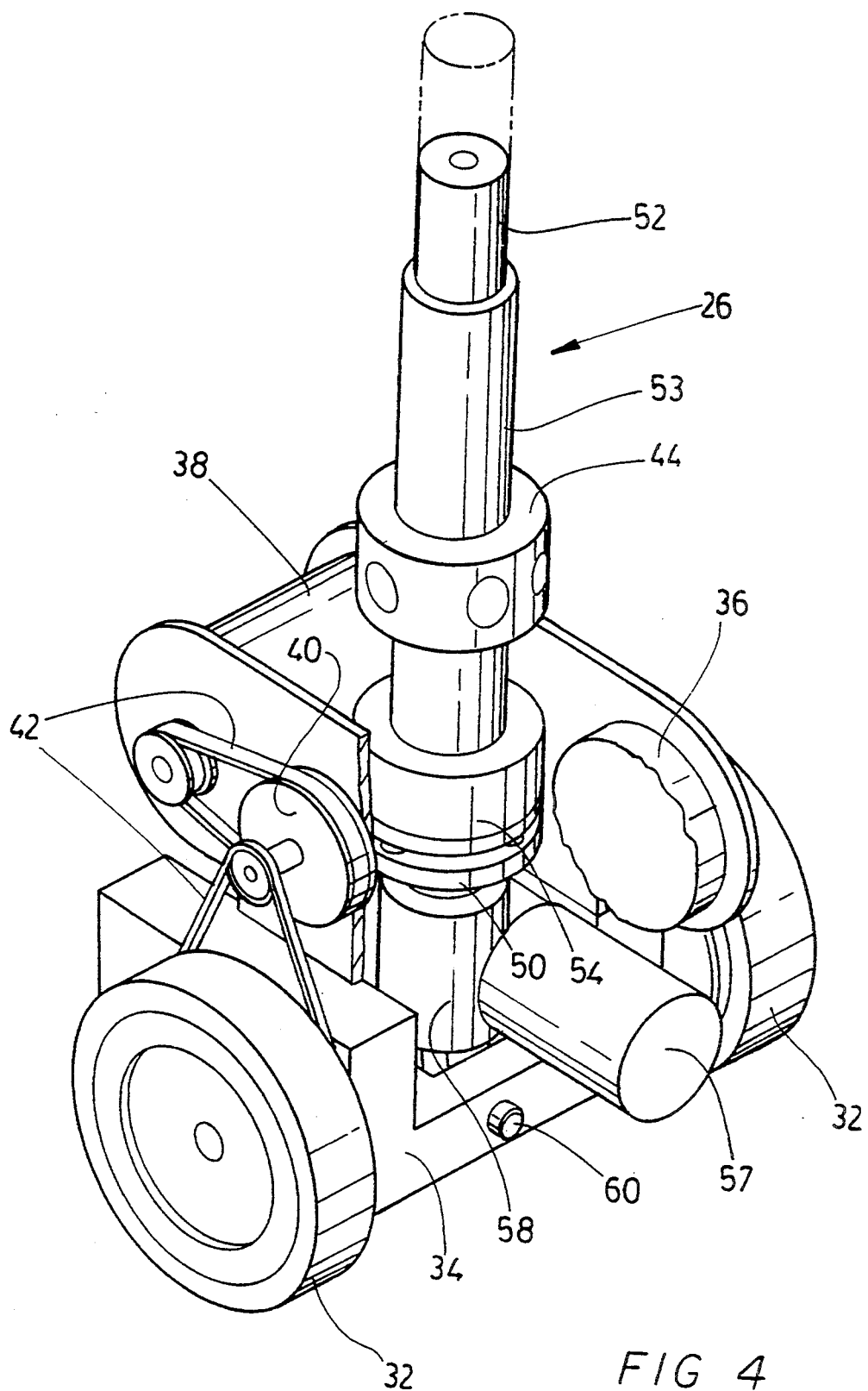
FIG. 4 is a perspective illustration of the drive unit, partially cut away, and, FIG. 5 is a section along the line 5—5 of FIG. 2.

The motorized drive unit 20 is shown in more detail in FIGS. 2, 3 and 4. In this example, it will be seen to comprise two drive wheels 32, mounted on a generally inverted U-shaped frame 34. Frame 34 supports two separate drive motors 36 and 38 connected through suitable pulleys 40, to respective wheels 32—32 via belts 42. the two motors, typically electrical motors, are capable of being driven in either direction, and are controllable independently from one another, by manual and software controls.

When the two motors are driven in one direction, both wheels 32—32 will rotate in the same direction and the motorized drive unit will drive the chair in the direction in which the two wheels 32—32 are facing. However, when one motor is driven in the reverse direction from the other, then the wheels 32—32 will rotate about the column 26, until the two wheels 32—32 line up with a new desired direction. The motors may then be driven so as to rotate the two drive wheels 32—32 together in the new direction, causing the chair to move from a standing start in the desired new direction.

The legs 24 carrying the free running wheels 22, are mounted on a sliding collar 44. Collar 44 is slidably mounted on column 26, and is normally urged downwardly by spring means 48. The sleeve may ride upwardly against the pressure of the spring 48. Thus when a person is sitting on the chair, the two drive wheels 32—32 of the drive unit will be pressed firmly against the floor or terrain on which the vehicle is placed, and when operated, will cause the chair to move, and the stabiliser wheels 22 will stabilise the chair against tipping.

In this embodiment of the invention, the column 26 is formed in two components namely a lower component 50 and upper and lower telescoping components 52 and 53. A clutch 54 releasably interconnects the upper and lower shaft components 50 and 53.

In this way, when it is desired to move from a standing start in a new direction, the drive unit may first of all be rotated into the desired direction, in the manner described above. During this movement the clutch may for example be disengaged. The clutch may then be engaged, thereby holding the shaft in that position. The chair may then be started up and moved in the desired direction from a standing start.

It will also be appreciated that by speeding up one of the motors 36, or 38, relative to the other, the movement of the chair can be steered.

In addition, it will be appreciated that if it is desired to rotate the entire chair to face in a new direction, then the motors 36 and 38 can be operated in opposite directions, while leaving the clutch 54 interengaged. The movement of the two motors in opposite directions will cause the two wheels 32—32 to move in opposite directions, thereby causing rotation of both the upper and lower components 52 and 53 of the column 26, causing the chair to rotate and face into a new direction.

The controls can be so arranged, by for example suitable software (not shown), so that the steering movement can be progressively increased and decreased, and the speed of movement increased or decreased, by suitably positioning the control.

Figure 5:
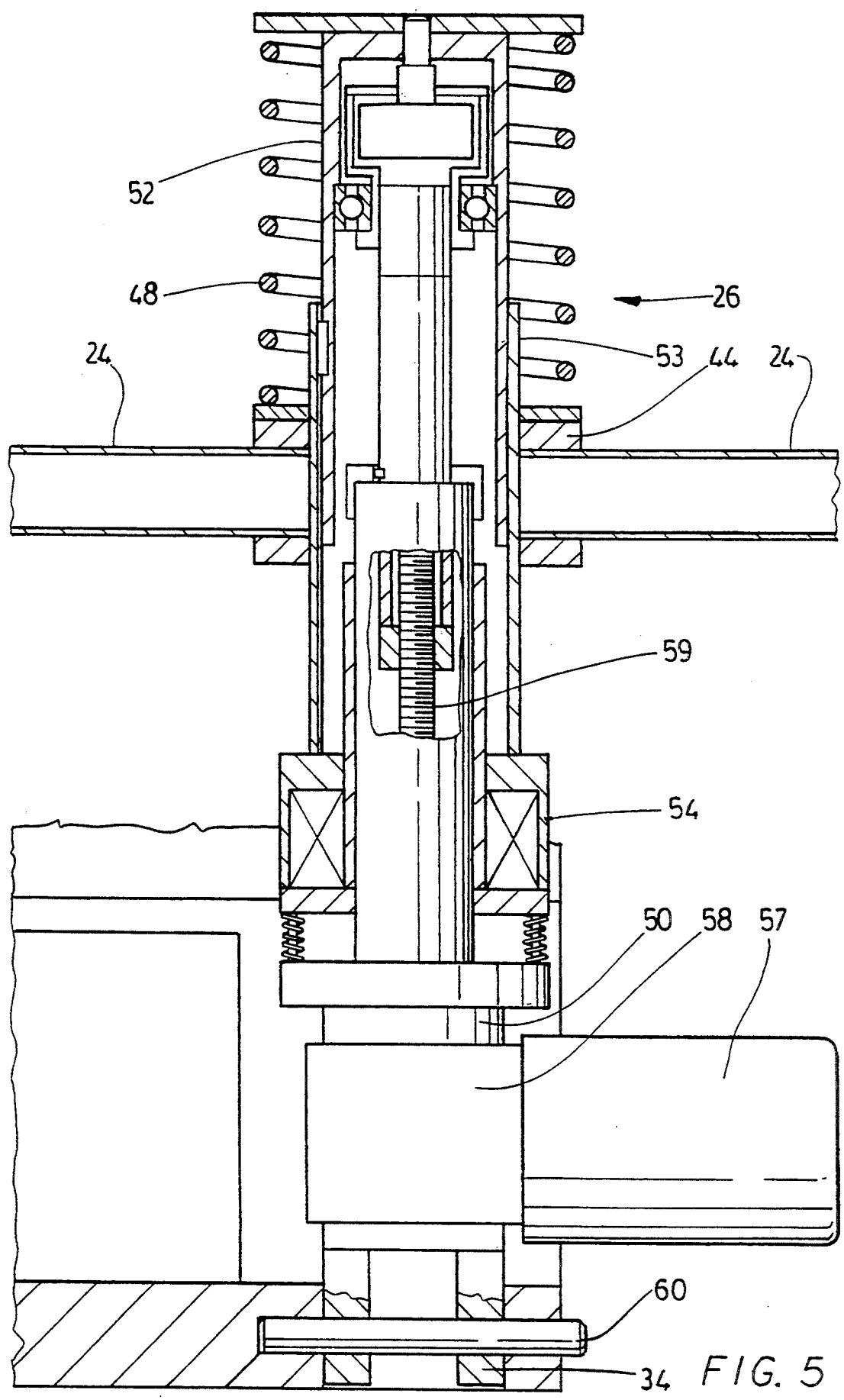

In order to raise and lower the seat relative to the drive unit, and free running wheels, as described above, upper column portion 26 comprises two telescopic sleeves 52 and 53. A raise motor 57 is provided, connected by gear box 58 to for example, screw means 59 (FIG. 5). Operation of motor 57 rotates screw 59, thus extending or retracting sleeve 53 relative to sleeve 52. This enables the occupant of the chair to lower the chair for reaching low objects, and to raise it once again to a comfortable height.

In addition to the foregoing features, provision is made for the chair to traverse uneven or sloping terrain or surfaces (FIG. 3).

This is achieved by the pivotal mounting 60, at the lower end of the lower column component portion 50. This pivotal mounting 60 allows the drive unit frame 34 to tilt, relative to the axis of the column 26. Thus although for example the outrigger legs 24 may encounter some uneven terrain (FIG. 3), and thus tend to tilt the chair slightly out of the vertical, the two drive wheels 32 of the drive unit will remain in contact with the terrain thus ensuring that the wheelchair continues to move in the desired direction.

The control panel 30, which in this example is shown mounted on the right arm of the chair for the sake of illustration, consists essentially of a "joystick" control lever 62, swingably mounted in a base 64. The control lever 62 may be moved forwardly or backwardly, or from side to side, or in a any diagonal fashion. Suitable contacts of a type well known in the art (not shown) will be located within the base 64. An on/off mode switch 66 may be incorporated in the top of the control stick, or may be provided separately, if desired. The mode switch 66 is designed to provide an on/off control to the power source, and can also control the clutch, so that it is either engaged or disengaged.

The mode switch 66 may also operate the raise motor 57, so as to raise or lower the seat.

The mode switch, in a way that is more or less transparent to the user, chooses between software methods of control. The mode switch selects either "drive mode" or "reach mode". Once the mode has been selected than movements of the joy stick (or any other control interface) results in a particular set of actions. When a different mode is selected, then those same movements (of the joy stick) result in a different set of actions. For example, in the present case when the user switches into "reach mode", left and right movements of the joy stick cause the chair to swivel to the left and swivel to the right respectively. Forward and backward movements of the joy stick cause the chair to raise and lower. Thus, in this mode, the chair stays essentially in place, but combined swivelling and vertical movements enable the subject to reach from this stationary position, hence the name "reach mode".

Suitable control electronics are provided in a remote switch box (not shown), and will be connected in a suitable manner to a power source such as the batteries B.

In this way, all of the operations of the chair 10, may be controlled by one hand for example, or by another part of the body, in a simple manner, requiring a minimum of instruction or practice on the part of the handicapped person.

In the present case when "drive mode" is selected, the first movement of the joy stick results in a "point-and-go" action. That is, the clutch automatically disengages, the drive wheels turn to face the direction indicated by the joy stick or other control, the clutch re-engages and the chair begins to move in that direction. The speed of movement is proportional to the extent of deflection of the joy stick and the direction is equal to the pointed direction of the joy stick. Once the chair is moving, further changes in the indicated direction of the joy stick result in differential speeds of the two wheels causing the normal steering or turning function. "Point-and-go" mode is not engaged again until the chair reaches a complete stop.

Thus, if the user wants to drive the chair in the normal fashion, he would select drive mode, push the joy stick forward causing the wheels to align forward in the normal manner and then the chair would behave like any other powered chair and would steer as the stick is moved from side to side. Alternatively, if the user wishes to move sideways or diagonally, or in any specific direction to, for example, access the inside of a cupboard or refrigerator, he would simply push the joy stick in the general direction of desired movement. If the direction requires some adjustment, the user has the choice of either coming to full stop and pointing in a new direction or of moving the joy stick somewhat to the left or right resulting in a steering action.

This merely describes one way in which the chair may be controlled. Other controls, and other software may be employed without departing from the invention.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A multi-directional motorized wheelchair having a seat portion, and a back portion, and comprising;
   two drive wheels, each said drive wheel having a separate motor means for driving a said drive wheel forwardly or backwardly independently of the other of said drive wheels;
   drive wheel mounting means mounting said drive wheels beneath said seat portion;
   means for operating said drive wheels either simultaneously in the same direction, or one of them in one direction, or simultaneously in opposite directions;
   stabilizer wheels mounted beneath said seat portion, and extending outwardly from around said drive wheels, whereby to stabilize said wheel chair, and,
   slidable mounting means on said column means, said stabilizer wheels being attached to said slidable mounting means, and being slidable relative to said column means, and spring means urging said stabilizer wheels downwardly against a surface beneath said wheel chair.

2. A multi-directional motorized wheelchair as claimed in claim 1 including column means extending downwardly beneath said seat portion, said drive wheel mounting means mounting said drive wheels at a lower end of said column means, whereby to engage a surface beneath said wheelchair.

3. A multi-directional motorized wheelchair as claimed in claim 2 wherein said column means comprises first and second column portions, and clutch means selectively engageable and disengagable, connecting said first and second column portions, whereby said drive wheels and said drive wheel mounting means may be rotated relative to said seat portion, when said clutch means is disengaged, and whereby when said clutch means is engaged, rotation of said drive wheels about a vertical axis will cause rotation of said seat portion.

4. A multi-directional motorized wheelchair as claimed in claim 1 including swingable means connecting said drive wheel mounting means to said column means, whereby said drive wheel mounting means may tilt relative to the axis of said column means, whereby to keep said two drive wheels in contact with a surface beneath said wheel chair.

5. A multi-directional motorized wheelchair as claimed in claim 3 including raise means in said column means, whereby said seat portion may be raised and lowered relative to a surface beneath said wheel chair, and including raise motor means operable to raise and lower said seat portion relative to said surface.

* * * * *